Aug. 10, 1965  D. FRISHMAN  3,199,516
PROCESS OF MAKING LONG HAIRED PILE FABRIC AND MAKING
ARTIFICIAL HAIRPIECES THEREFROM
Original Filed Sept. 12, 1963  11 Sheets-Sheet 1

INVENTOR.
Daniel Frishman
BY
Wilkinson, Mawhinney & Theibault
ATTORNEYS

INVENTOR
Daniel Frishman

Aug. 10, 1965   D. FRISHMAN   3,199,516
PROCESS OF MAKING LONG HAIRED PILE FABRIC AND MAKING
ARTIFICIAL HAIRPIECES THEREFROM
Original Filed Sept. 12, 1963   11 Sheets-Sheet 3

INVENTOR
Daniel Frishman
BY
Wilkinson, Mawhinney & Thibault ATTORNEYS

INVENTOR.
Daniel Frishman

Aug. 10, 1965 D. FRISHMAN 3,199,516
PROCESS OF MAKING LONG HAIRED PILE FABRIC AND MAKING
ARTIFICIAL HAIRPIECES THEREFROM
Original Filed Sept. 12, 1963 11 Sheets-Sheet 6
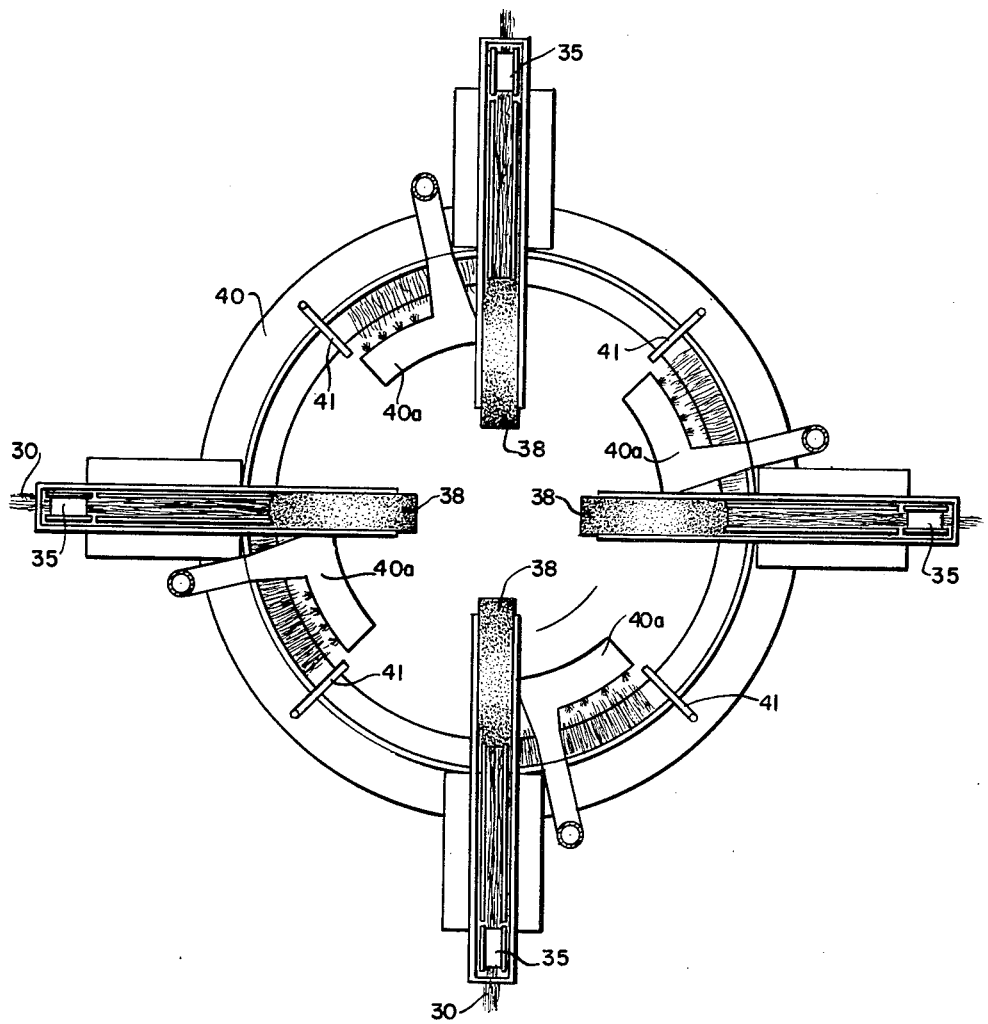
FIG.II.
INVENTOR.
Daniel Frishman
BY
Wilkinson, Mawhinney & Theibault
ATTORNEYS

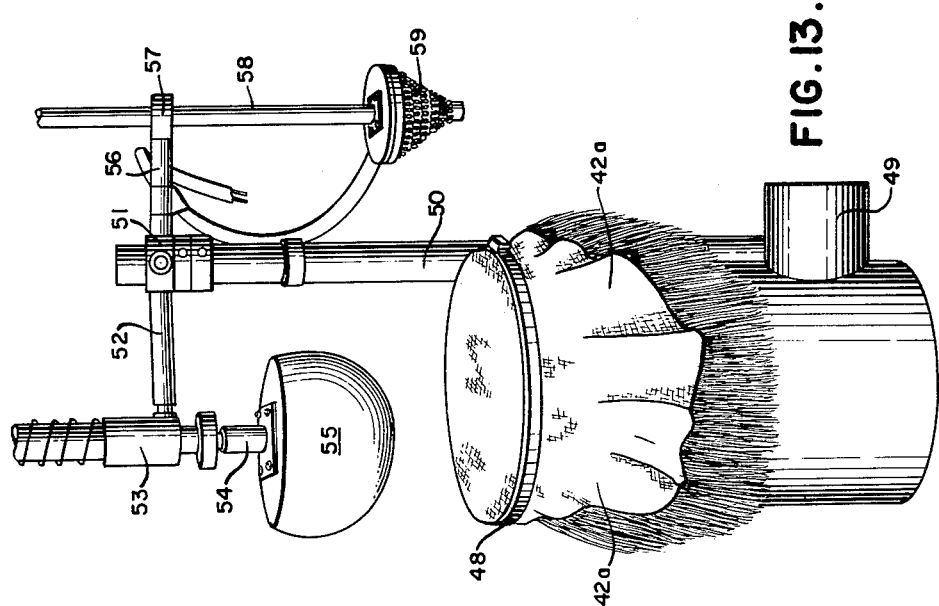
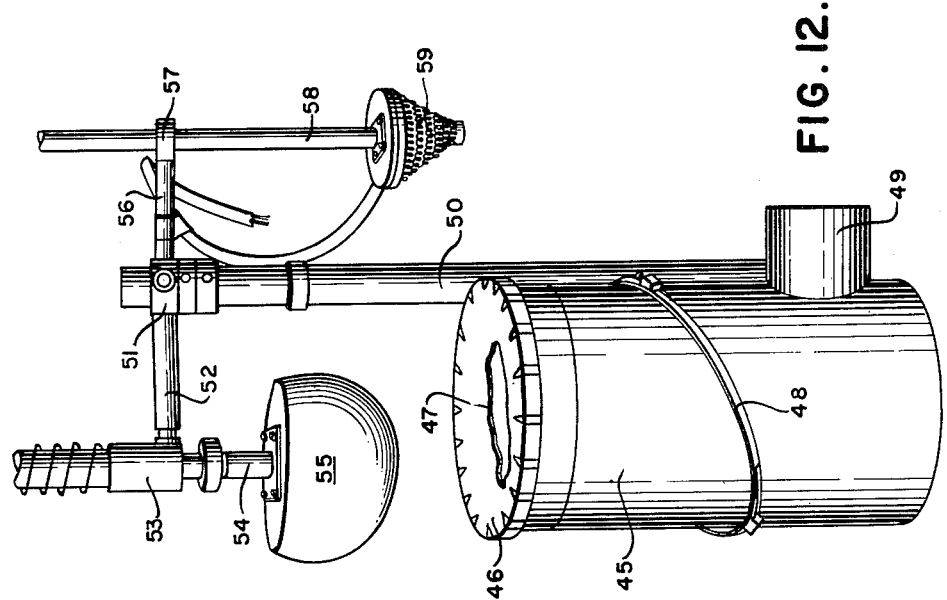

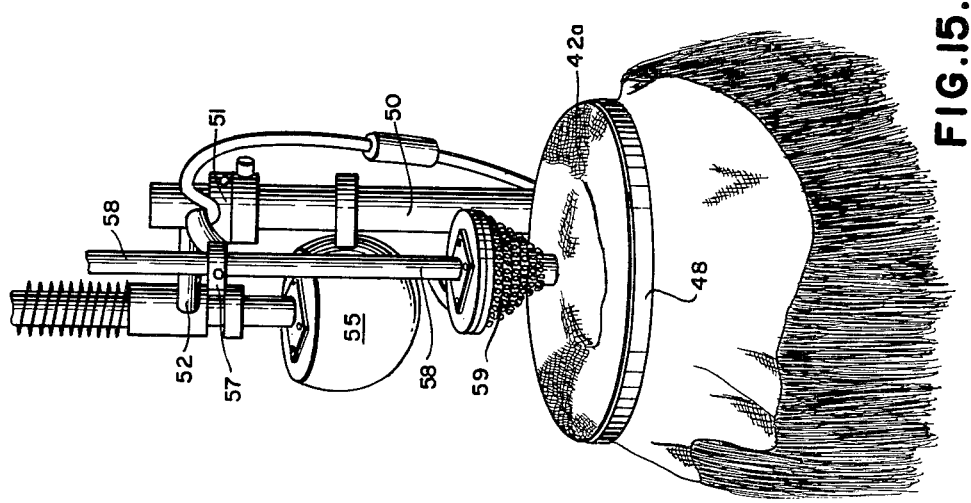
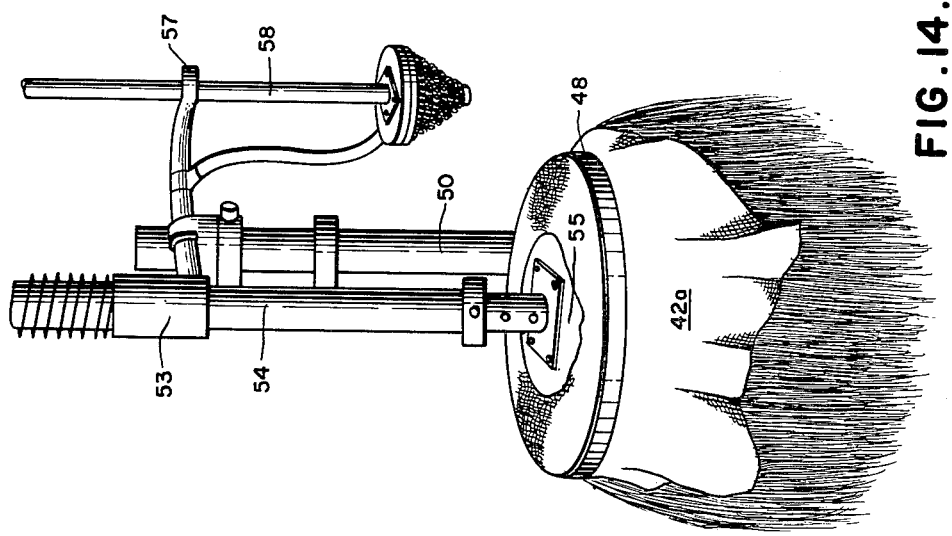

Aug. 10, 1965 D. FRISHMAN 3,199,516
PROCESS OF MAKING LONG HAIRED PILE FABRIC AND MAKING
ARTIFICIAL HAIRPIECES THEREFROM
Original Filed Sept. 12, 1963 11 Sheets-Sheet 9

INVENTOR.
Daniel Frishman
BY
Wilkinson, Mawhinney & Theibault
ATTORNEYS

Aug. 10, 1965 D. FRISHMAN 3,199,516
PROCESS OF MAKING LONG HAIRED PILE FABRIC AND MAKING
ARTIFICIAL HAIRPIECES THEREFROM
Original Filed Sept. 12, 1963 11 Sheets-Sheet 10

INVENTOR.
Daniel Frishman
BY
Wilkinson, Mawhinney & Theibault
ATTORNEYS

*INVENTOR*
Daniel Frishman

United States Patent Office 3,199,516
Patented Aug. 10, 1965

3,199,516
PROCESS OF MAKING LONG HAIRED PILE FABRIC AND MAKING ARTIFICIAL HAIRPIECES THEREFROM
Daniel Frishman, Andover, Mass., assignor to Reid-Meredith, Inc., Lawrence, Mass., a corporation of Utah
Original application Sept. 12, 1963, Ser. No. 308,598, now Patent No. 3,139,093, dated June 30, 1964. Divided and this application Feb. 27, 1964, Ser. No. 356,997
10 Claims. (Cl. 132—5)

The present invention relates to a long haired pile fabric, process and apparatus for manufacturing the same, and articles made therefrom, and is a divisional of my application Serial No. 308,598, filed September 12, 1963, now U.S. Patent No. 3,139,093, and relates in one embodiment to wigs to be donned by females as a hairdress as distinguished from a hat or other external ornamental or covering device worn by the human being.

An object of the present invention is to provide an article of manufacture of the above type which may be economically constructed and which will have all of the appearances and hair characteristics of the more expensive handmade articles and those made of natural hair.

A wig constructed in accordance with the present invention may be made of either natural hair strands or synthetic monofilaments, such as for example Dynel. The wig, constructed in accordance with the present invention, is shaped to conform to the contour of the human head and to be retained thereon without creeping, sliding or in any other manner being accidentally displaced thereon or dislodged therefrom.

Another object of the present invention is to provide a wig, the hair of which is manageable and stylable so that the wearer thereof may readily change hair styles, the previous hair style of which may be removed by simply combing the wig in the case of Dynel strands.

A further object of the present invention is to provide a relatively simple and economical process whereby a hairpiece may be knit, formed, and styled requiring a minimum of human attention per unit of manufacture. The process entails doffing the hair or synthetic monofilament into a circular knitting machine at the time of knitting the base cap or fabric of the wig to thereby lock or restrain the filaments against sliding or accidental loss from their interlocked relationship with the cap structure of the wig during use of the wig by the wearer.

A still further object of the present invention is to provide a process which may be employed with a Wildman Jacquard type circular knitting machine which employs a single set of needles and which machine knits a plain knit stitch of either one or two ends of yarns. A satisfactory wig is obtained by first preparing a sliver of nine inch or longer ends of preferably 24 to 40 denier Dynel monofilaments. The most preferred embodiment uses 40 denier Dynel filaments because wigs made with filaments of this denier retain their set when curled better than those of finer deniers.

This sliver is prepared from a tow which consists of several thousand filament ends which have been previously dyed and the cut ends have been blended or introduced without blending to a converter which issues forth the sliver. The sliver is then fed to the carding mechanism of a Wildman Jacquard machine, which card mechanism has been modified to accommodate the greater than six inch Dynel ends of the sliver and to present the Dynel ends to the shanks of the needles of the knitting machine whereby they are doffed from the card roll onto the needles in advance of the introduction of the knit yarn ends to the knitting needles. The filament ends are fed to the needles in such a manner that at the time of knitting they are not wound or twisted with one another. In order to carry out these steps of the method, mechanical modification was required to the carding mechanism of the Wildman Jacquard machine.

The method further is an advance over the prior art in that the tubular fabric knit is then slit and cut into lengths having a relatively smooth back and a long hairy face.

The thus knit fabric is then shaped or formed to accommodate its being received over and retained upon the head of a human being. The wig after forming may then be styled.

The thus formed long hairy faced knit fabric may also be formed into articles other than wigs, for example, bearskin rugs, fur coats or any article to be constructed from the furry pelt of an animal. The fabric of the present invention may be worked similar to the furry pelt or hide of an animal and may be formed by sewing into articles of wearing apparel with the long furry side exposed. The dense interlocking of the nine inch Dynel filaments into the fabric structure to create the furry face gives the thick fluffy appearance of a natural pelt.

Another object of the present invention is to provide mechanism for not only knitting the basic wig structure but also for the final formation thereof.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 11 is a schematic top plan view of a Wildman Jacquard machine employed in accordance with the present invention having four cards thereon.

FIGURE 12 is a perspective view of one form of head forming station which may be used in accordance with the present invention.

FIGURES 13 through 15 are views similar to FIGURE 12 in which a piece of fabric knit in accordance with the present invention has been placed thereon incident to forming the fabric to conform to a head contour.

THE PROCESS

The process and apparatus of the present invention as directed to the production of a wig or artificial hairpiece is shown in FIGURES 1 through 4 which comprises generally a knit cover A having hair-like filaments B interlocked therewith, which filaments may be either of natural hair or synthetic monofilaments stylable into a wig to be worn over the hair on the human head. The knit cover A is formed to be geometrically complemental to the upper portions of the human head.

Referring more particularly to the drawings, and for the moment to FIGURES 8 through 21, one form of practicing the process of producing an artificial hairpiece in accordance with the present invention is shown.

Preparatory to commencing the process illustrated, a sliver 30 is prepared by initially taking a tow consisting of filaments of 24 to 40 denier Dynel, dying the same to the desired shade or color for the filament ends of the artificial hairpiece to be constructed. For best results the coarser deniers in this range are preferred. The dyed tow is then passed through a Pacific Converter in which the dyed tow is cut into ends, for example and preferably, in excess of six inches in length, and for example in the wigs shown in FIGURES 1 and 2, nine inch ends are employed.

Figure 10:
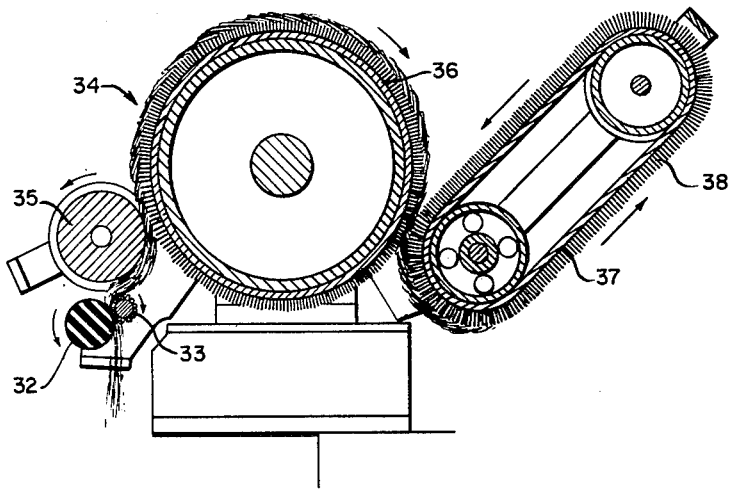
FIGURE 10 is a diagrammatic view of FIGURE 9 showing the path of filament transfer.

These cut ends are then blended to form the sliver 30. The sliver is then wound upon a reel or drum 31 or coiled in a container. The sliver, best seen in FIGURE 10, is then introduced to the card mechanism 34 through rolls 32 and 33. The filaments of the sliver are introduced to the card cylinder 36 through a lickerin 35 in conventional carding practice. The filaments traveling on the card cylinder 36 are removed therefrom by a belt doffer 37 having pin-like projections 38 thereon for engaging and removing from the card cylinder 36 the filaments from the sliver for doffing these filaments onto the knitting needles 39 of a conventional Wildman Jacquard circular knitting machine 40.

As the needle cylinder rotates counterclockwise, shown by the arrow in FIGURE 11, the needles having the filaments thereon are advanced to a knit point 41 or 41ª which is the conventional tube feed for one or more ends of yarn which will form the cover or cap structure of the artificial hairpiece. The yarns may be of any suitable material such as two ends of nylon, Acrilan or even, because of its stretch characteristics, Lycra.

Figure 8:
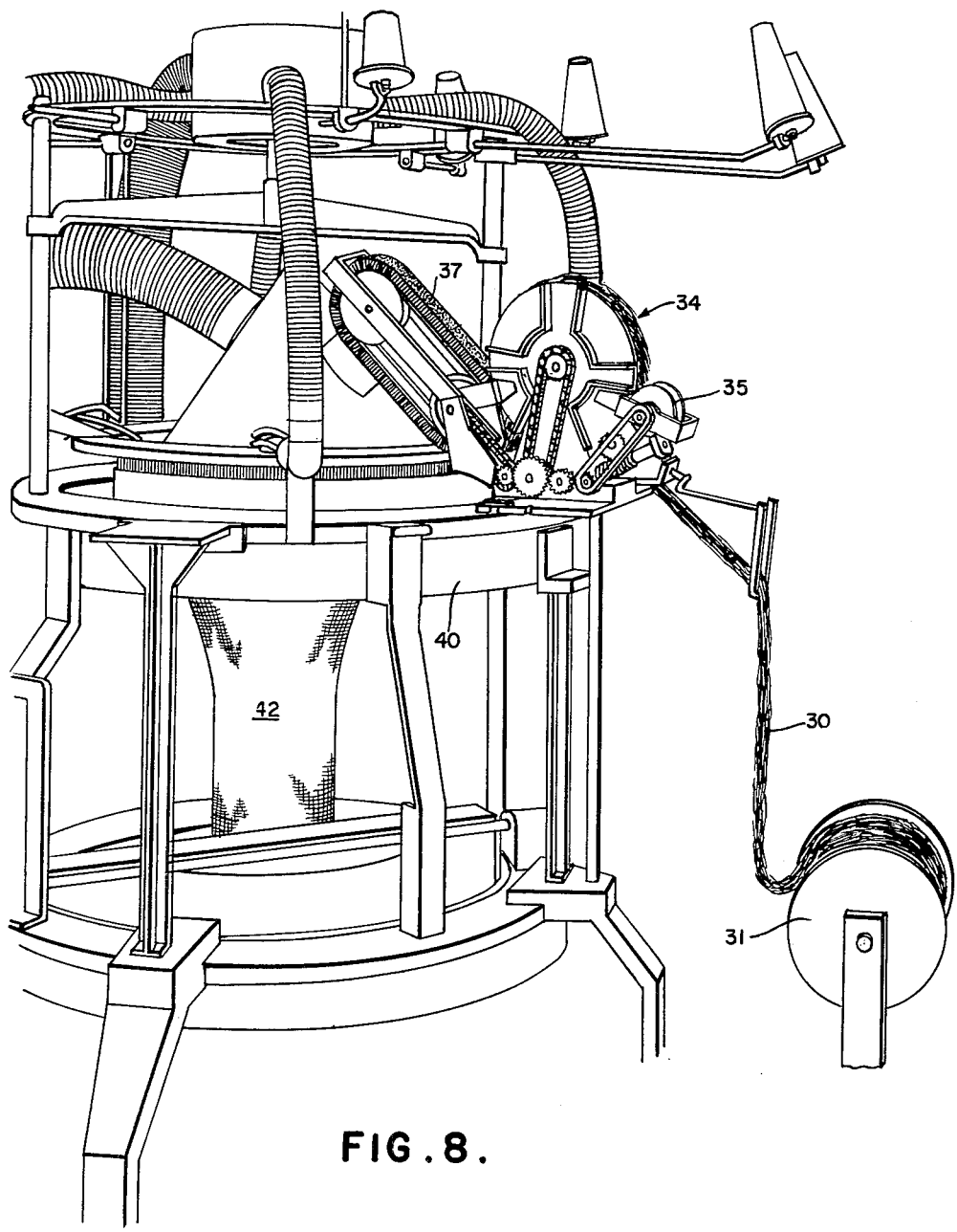
FIGURE 8 is a perspective view of a Wildman Jacquard circular knitting machine modified in accordance with the present invention for knitting wigs.

Also at this point torque yarns may be employed to provide the ultimate desired stretch characteristics for the cover of the hairpiece, that is, characteristics in excess of the normally inherent contractile characteristics of any knit fabric due to the knit structure. At this knit point 41 the filaments from the sliver are introduced into the cover fabric as it is being knit and the fabric 42 is shown in FIGURE 8 descending from the needle cylinder to the take-up mechanism of the Wildman Jacquard machine.

The filaments are secured or interlocked to the cover knit structure on the inside of the tube 42 and the outside thereof shown in the drawing is a relatively smooth knit structure. A back coating may be applied to facilitate locking of the filaments in the knit structure of the fabric.

The inside of the tube 42 has a long hairy face of long Dynel 40 filaments. The tube is then slit to form a long fabric having a smooth knit surface on one side and a long hairy face on the other side. At this point the thus formed fabric may be made into a bearskin rug, hat, fur coat or other article of apparel or it may be cut into small sections to be formed into wigs.

In the preferred embodiment of making a wig, a length of knit tubular fabric 42 containing the interlocked filaments in the knit structure is then removed from the Wildman Jacquard machine 40, the tubular fabric slit to open the same and a section of the fabric 42ª, as shown in FIGURE 13, may be placed over a forming station where a die member imparts to the fabric 42ª a crown shape or cavity generally complemental to the outside contour of the upper portions of the human head. The thus formed section 42ª is then re-inverted with the cavity directed upwardly, as shown in FIGURE 16, at which time the portion of the fabric 42ª surrounding a head form or mold is then taped with elastic or resilient tapes applied, for instance, by adhesive to at least assist in confining the wig to the head form and ultimately to the head of the wearer.

Figure 5:
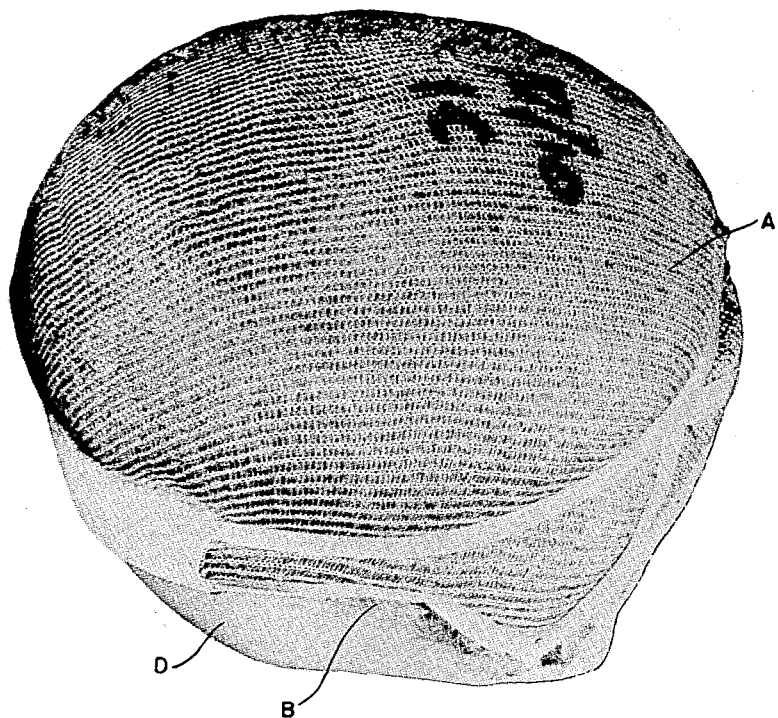
FIGURE 5 is a photograph of a wig constructed in accordance with the present invention during the taping step of the wig forming process.
Figure 16:
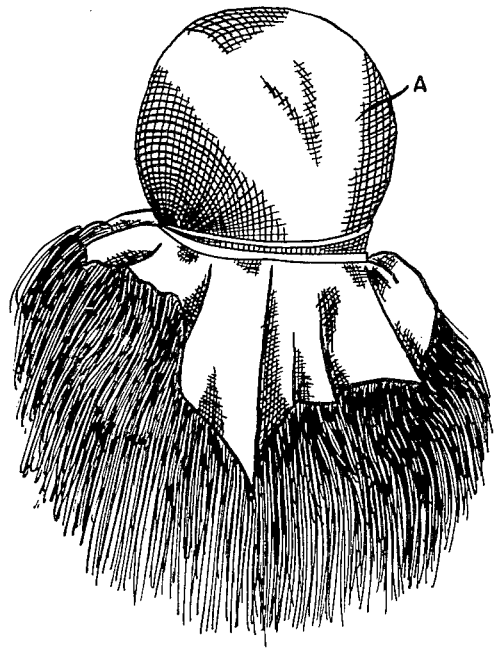
FIGURES 16 and 17 are perspective views of the forming steps at two different stages thereof.
Figure 17:
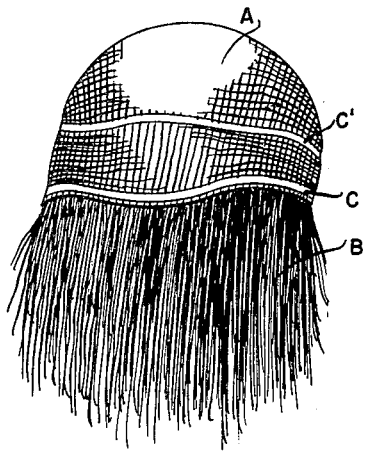

Prior to the taping when the cap or cover structure is in the inverted position in FIGURES 16 and 17, a template is applied over the smooth side of the fabric 42ª on the head form to mark the outlines for the application of tapes and elastic bands. The wig is then taped and the excess fabric removed therefrom, as shown in FIGURE 5.

The tapes may be further secured to the cover structure as by sewing at the corners and tacking by sewing other portions of the tape.

Figure 18:
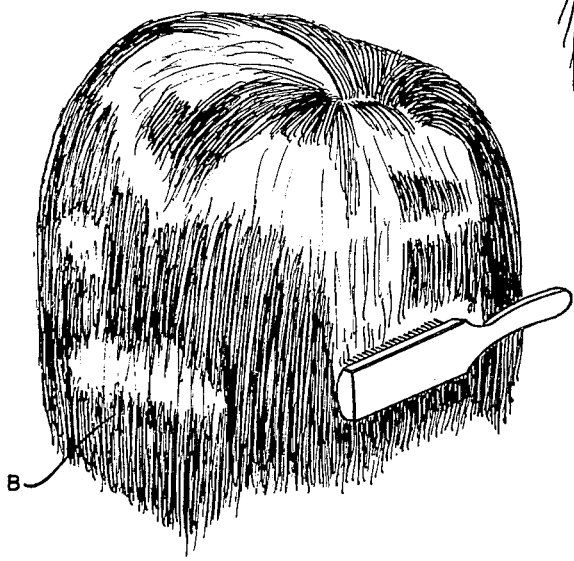
FIGURE 18 is a perspective view of the taped wig cap structure of FIGURE 17 inverted to place the hair on the outside thereof.

The wig is then re-inverted and placed upon a head form, as shown in FIGURE 18, with the filament side outwardly and the wig is brushed prior to styling to remove any excess filaments and to orient the filaments for styling.

The wig is then washed in water to remove the water soluble chemicals on the various filaments and yarns which facilitate their knitting. The thus washed wig is then subjected to a chemical bath to render the hair filaments more susceptible to handling and styling.

Figure 1:
FIGURE 1 is a photograph of a styled wig constructed in accordance with the present invention.
Figure 2:
FIGURE 2 is a photographic view similar to FIGURE 1 of a modified form of hair style of the same basic wig of FIGURE 1.
Figure 19:
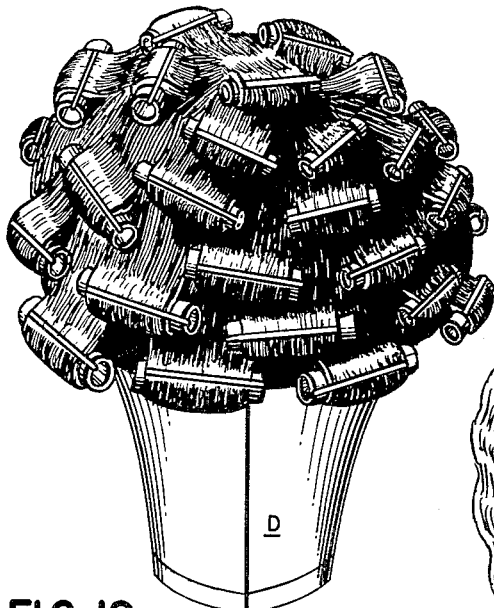
FIGURE 19 shows the wig of FIGURE 18 put up in curlers for styling purposes.
Figure 21:
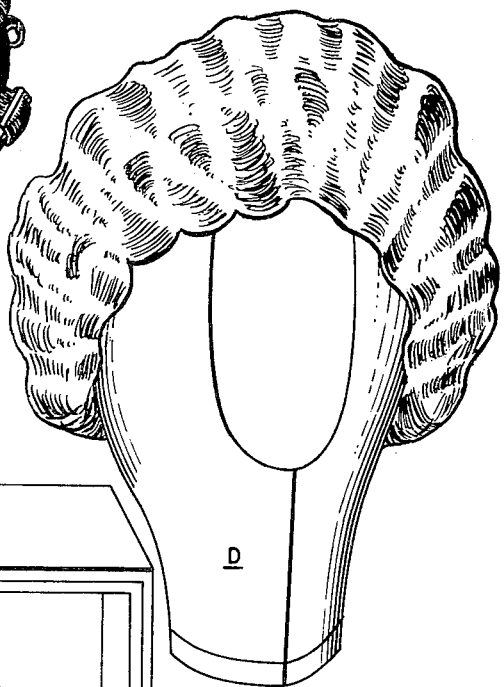
FIGURE 21 is a perspective view of the wig of FIGURE 19 with the curlers removed after thermal setting and combed to style.
Figure 20:
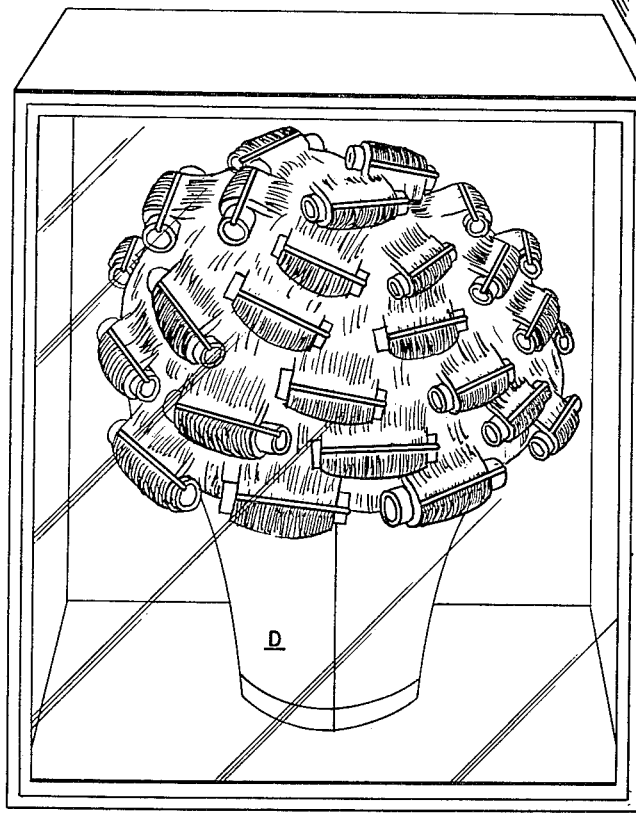
FIGURE 20 shows the wig of FIGURE 19 placed in a drying and setting oven for thermally setting a curl in the synthetic hairlike monofilaments.

As best seen in FIGURE 19, with the artificial hairpiece still mounted on a head form, the filaments are put up in curlers following conventional hair dressing practice. The head form and wig with curlers are then placed in a setting oven for imparting at least a partial thermal set in the filaments while in the curled condition so that upon removal of the curlers the filaments will possess the liveliness and body essential to the correct styling of the hair-like filaments on the exterior surface of the wig. Such a thermally formed and set wig is shown in FIGURE 21 and photographically two hair styles are shown in FIGURES 1 and 2 of the drawings of wigs constructed in accordance with the foregoing process.

To further assure, by means other than the knitting operation, that the filaments be retained in the cover or cap structure, a synthetic bonding material or adhesive may be applied to the non-filament side of the fabric.

THE ARTICLE

Figure 6:
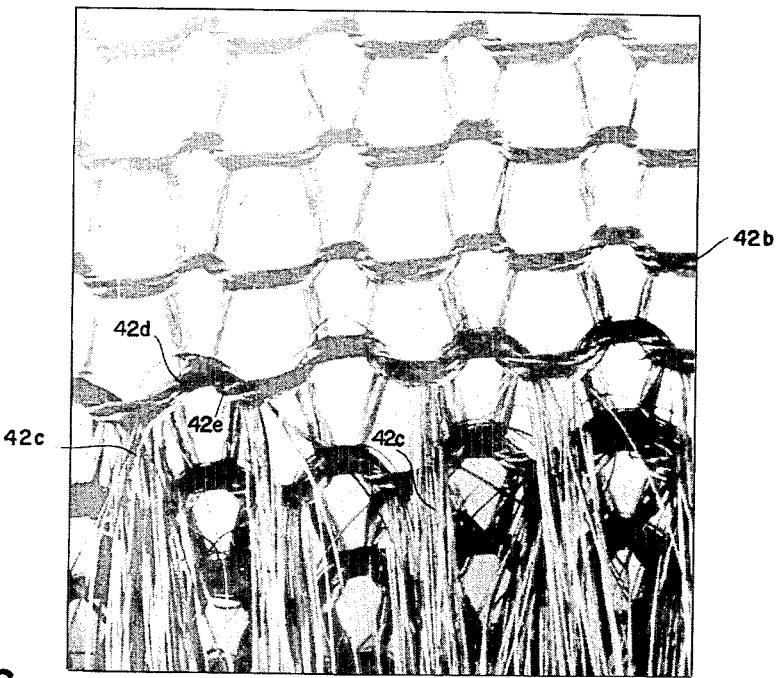
FIGURE 6 is a magnified photograph of the knit structure and method of locking the hair-like filaments to the basic wig cap structure.
Figure 7:
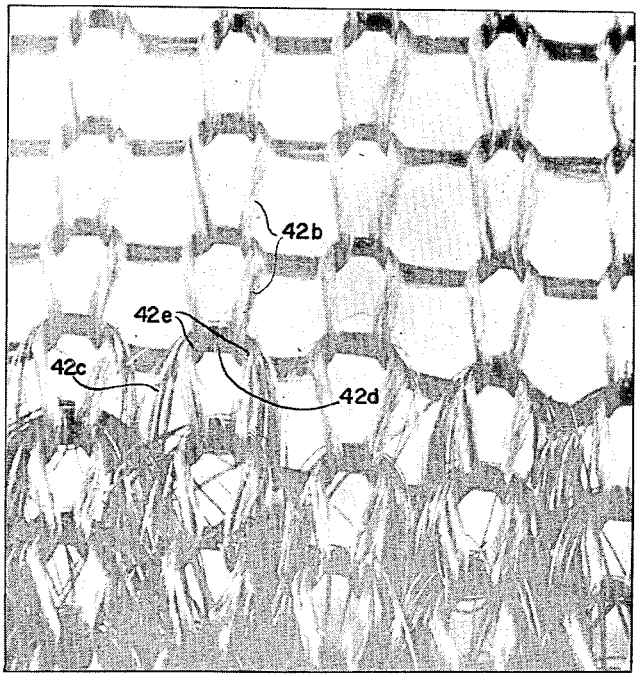
FIGURE 7 is a magnified photograph taken from the reverse side of FIGURE 6.

Referring to FIGURES 1 through 7 inclusive, and for the moment specifically to FIGURES 6 and 7, the knit structure of the cover A is shown in a magnified photograph which reveals the base cover structure to be knit from two ends of nylon 42ᵇ. The hair-like filaments 42ᶜ are shown interlaced between the bight of a needle loop 42ᵈ and the base curved portions of sinker loops 42ᵉ. The photograph of FIGURE 7 is of the inner side of the identical fabric of FIGURE 6.

The structure of FIGURES 6 and 7, while showing interlacing as one form of securing or interlocking the filaments 42ᵇ with the cap or cover structure A of the wig, is but one form of securing these filaments to the knit cover structure. They may be interknit or interlaced. However, the important factor in this structure is that they are interlocked against being readily pulled out or removed from the cap structure. The density of the knit structure of the cover both course-wise and wale-wise has been regulated to provide an open area to permit the pores of the head of the wearer to breathe in a natural manner and to reduce the overheating of the head which would come about from the use of a tight knit structure.

The human head, particularly the upper portion thereof, over which a wig will be worn, is anatomically divided into frontal, parietal, occipital and temporal lobes. These lobe areas of the human head are not identical for all human beings, some of these areas being more accentuated than others. It has been found, however, that generally speaking the human skull has a pronounced inwardly directed area from the outermost portion of the temporal lobes and for the wig to stay on the head of the wearer the wig must be forced to not only pass over the temporal areas when placing it on the head of the wearer, but it must also contract to embrace the lesser width areas of the head of the wearer below the temporal area. While this property of expansion and contraction of the cover to accommodate the temporal area has been emphasized, it is equally important that the wig conform to the geometric irregularities in the other areas above identified.

Figures 3, 4:
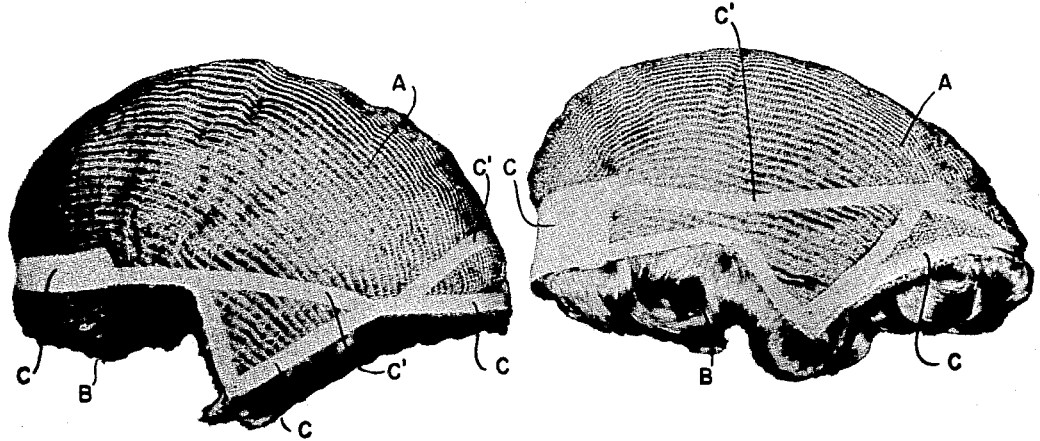
FIGURE 3 is a photograph of a wig constructed in accordance with the present invention with the cap portion thereof inverted.
FIGURE 4 is a photographic view similar to FIGURE 3 of a modified form of cap portion.

To further accomplish this end, as shown in FIGURES 3, 4 and 5, the knit cover A is taped by non-resilient tapes C which extend at least along or in the vicinity of the terminal edges of the knit cover. Auxiliary tape areas C' may be employed to further assist the knit cover in conforming to irregularities in the head structure as well as to retain the wig tightly about its edges to the head of the wearer so that the natural hair on the head of the wearer will not extend below the wig line, or line defined by the knit cover.

As best seen in FIGURE 3 the larger tape at the frontal area of the wig may be either a resilient or non-resilient tape as will be the edge tapes C. A resilient tape may be placed across the rear or left-hand end of the wig, as seen in FIGURES 3 and 4, but combinations of both resilient and non-resilient tapes may be employed. When the knit cover is knit of a stretch yarn such as a nylon torque yarn or Lycra, the tapes may be eliminated, but in the embodiment shown where both ends are regular nylon 42 the tapes are employed.

In order to assure that the tapes have been applied in the proper areas the tapes are applied while the inverted cover A is placed upon a head form D, as shown in FIGURE 5.

The hair-like filaments B employed with the cover A may be natural or synthetic and may be dyed different colors and blends of colors may be employed to further enhance styling characteristics.

A knit cover, because of its structure, possesses certain inherent properties of expansion and contraction. These properties are preferably further enhanced and assisted for retaining the wig on the head of the wearer by the use of the resilient tapes. FIGURES 3, 4 and 5 show the knit cap in final shaped form having closeness of the knit lines at the left- and right-hand ends of each of the covers of FIGURES 3 and 4 as compared to the more widely spaced intermediate areas, thus providing inherent expansive and contractile characteristics. This is very much emphasized when the wig is in its relaxed condition as it is in FIGURES 3 and 4.

THE MACHINERY

The machinery modification in order to knit a fabric having the long filaments on one side thereof only entails modifications to the conventional Wildman Jacquard machine in the following respect.

Figure 9:
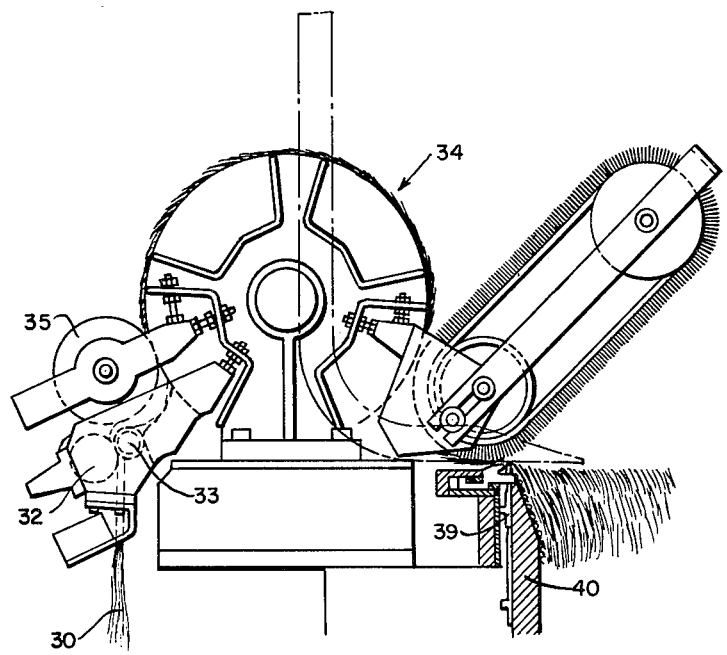
FIGURE 9 is a side elevational view with parts broken away and parts shown in section of the carding modification applied to the Wildman Jacquard machine in accordance with the present invention.

As best seen in FIGURES 9 and 10, the conventional doffer cylinder has been replaced by an endless belt roved about two cylinders, at least one of which is power driven. This elongated doffing member in the form of an endless belt provides a more efficient doffing means than does a conventional doffer cylinder. The conventional workers and strippers have been removed from the carding mechanism and a smooth lickerin 35 has been substituted for the rough lickerin. Positive drive feed rolls have been provided for supplying the sliver to the lickerin.

In the preferred embodiment utilizing a belt doffer 37, the knit point on the machine may be and preferably is adjacent the doffer. But in certain modifications of the invention the knit point on the machine is advanced circumferentially in the direction of rotation of the needle cylinder from the doffer. Thus it may be possible to use a conventional doffer cylinder if the knit point on the machine is advanced circumferentially in the direction of rotation of the needle cylinder from the doffer. The distance advanced should be such that the filaments already doffed onto the needles will not, at the moment they are actually knit into the base fabric, be locked at their trailing ends in the doffer cylinder by virtue of their being wound about, intertwined or twisted with other filaments, including those which have not yet been doffed. In the preferred embodiment and in these various modifications, it is essential that means be provided for laying the filaments out in such a manner that their trailing ends will not lock on the doffing elements by interengagement with other filaments on the doffing element at the moment the forward ends are knit into the fabric. In the preferred embodiment this is attained by providing the endless belt having at least one elongated doffing surface capable of receiving and laying out filaments so that they may be pulled free of one another from the doffng surface.

From the doffing zone to the knit point air may be provided to assure the proper relationship between the doffed filament and the knitting needles of the knitting cylinder.

The general pattern of the path of the air supplied, which air ducts are shown at 40ᵃ planar-wise, is outwardly and downwardly, that is, outwardly proximate the doffing zone and downwardly as the needles advance towards the knit point 41.

The conventional Wildman Jacquard machine having approximately ten needles to the inch has been modified by removing every other needle so that in effect five needles per inch is employed to knit the fabric which results in a less dense, more porous fabric. The linear speed of the doffer belt 38 has been increased over the conventional doffer cylinder because of the additional length of the filament being doffed.

The molding apparatus for forming the cavity in the knit cover is best seen in FIGURES 12 through 15. A hollow drum 45 is provided having a head 46 with a resiliently deformable mouth 47, which mouth 47 acts as the female member of a die. A locking ring 48 is provided for constraining and retaining a section of the knit fabric 42ᵃ in place for the cavity forming operation. Located at the base of the cylinder 45 is an opening 49 into which may be introduced cooling air to facilitate the setting of the stretched and deformed yarns of the cap or cover structure.

Upstanding from the drum member 45 is a standard 50 on which is swively mounted a collar 51 having an arm 52 extending therefrom. Carried by the outer free end of the arm 52 is a bearing sleeve 53 which reciprocably receives a shaft 54 to which is secured a head-forming male die member 55.

Extending off the other side of the collar 51 is an arm 56, the outer end of which terminates in a clamping device 57 which secures in place a shaft 58 to which is secured a heating element of a generally conical shape. The heating unit 59 is of the electrical resistance type and receives power from the conventional electrical cord supply to an A.C. source.

This forming apparatus is employed by first placing a section or piece of fabric 42ª knit on the Wildman Jacquard machine and having these long hair-like filaments extending from one side thereof across the top of the drum member 45 and the clamping ring 48 is then locked in place, as shown in FIGURE 13.

The collar 51 is then rotated to bring the male die member 55 vertically above the opening 47 beneath the fabric 42ª and the shaft 54 is urged downwardly forcing the male portion 55 of the die to cause the knit fabric to be de-formed, as best seen in FIGURE 14, to take the general outline of a cavity dictated by the male die and as constrained by the mouth 47 of the cover 46. When the material has been forced down into the drum 45, the male die 55 is removed and the impression of this partial cavity is then left as an indentation in the fabric, as best seen in FIGURE 15, at which time the collar 51 is rotated to place the heating unit 59 directly over the cavity.

Current is applied to the electrical heating unit 59 and heat is generated which causes the de-formed cavity indentation in FIGURE 15 to tend to shrink and draw itself taut across the mouth of the opening 47, just as viewed in FIGURE 13, at which time collar 51 is again rotated to remove the electrical heating elements and the male die is then swung around into position and forced downwardly, as in FIGURE 14. It is thus retained and a cold blast of air is introduced through the opening 49 to cause the heated plastic yarns of the knit cap structure to set and retain substantially the cavity formed by the die member 55.

While I have shown two separate members, one for forming and one for heating, it will be appreciated by those skilled in the art that these two instrumentalities may be incorporated in a single instrumentality; and while I have shown but a single die and forming unit for making one wig at a time, it will be readily appreciated that multiple units embodying this principle may be made and the multiple units may be tied together for gang operation.

As an alternative a section of the knit tubular fabric just large enough to make a single wig may be cut and placed over a forming block and pinned in place after which a template is applied over the fabric and chalk lines drawn to define the tape lines over which is applied the tapes which are stapled in place. The tapes are coated with an adhesive to secure them in place. Any suitable adhesive, including those requiring solvent activation, may be used. After taping the excess fabric beyond the terminal edge of the wig line is cut away. The staples are removed, the wig washed and dried, put up in curlers, heat set, curlers removed, wig combed out, thinned and styled.

Referring now to the fabric per se, and especially the pile or face, the type of fiber used is unlimited. I have obtained special long hair varieties of mohair and wool where the average staple length was six or seven inches and I have successfully made these into long hair pile fabrics. Naturally these long haired materials are always processed into top, and then of course it is a simple matter to feed the sliver of the top into the card on the knitting machine. Other natural or synthetic fiber may also be used. The denier could range from about 3 to 80 denier. Staple lengths used have been up to as much as thirteen inches, but I am sure that the length could be increased in the preferred embodiment to about fifteen inches and with modification of the machine probably eighteen to twenty inches. I have also knit 3 denier 1½ inch acrylic fiber with the type of card described herein.

My invention is unique since it permits one to knit fibers successfully which are longer than five or six inches. The crimp or waviness of the fibers can be utilized to give fabrics of different appearance and functional properties. For example, if the fiber had about seven or eight crimps per inch one could obtain a very high, bushy type of fabric. In contrast fibers with no crimp give the flat type of construction that we have in the wig. It is also possible to have fibers in which the crimp is more of a long undulating wave and here one would get an interesting long haired Karakul type effect. Obviously a variety of colors can be used and a mixture of colors is entirely possible. Similarly it is possible to mix different types of fibers to obtain a variety of effects. For example, in most natural furs there is a mixture of short fine fibers which forms the base or ground of the fur and longer coarse fibers which form guard hairs. The short fibers provide a good insulating layer and some support for the long fibers while the longer fibers which are coarser, protect the fine fibers from the mechanical distortion of wind, water, or solid objects. It would be a simple matter to prepare a sliver consisting of, for example, 50% two or three inch, 6 denier acrylic fiber and 50% nine inch, 40 denier, uncrimped modacrylic fiber. This would give a very bushy and serviceable fabric.

The backing yarn can be a variety of materials. I have used cotton, acrylic, modacrylic, nylon and stretch nylon backing yarns. At the present for the wig, a filament nylon yarn is being used because this gives excellent strength with the least amount of fuzziness so that an open ventilated structure can be obtained. With certain yarns which can be easily heatset, as for example, the modacrylic yarns, one can obtain good locking of the back and dimensional stability by treating the fabric with infra-red or hot air so that the backing yarn reaches a temperature of about 290° F. Nylon, too, can be heat set but this requires temperatures of closer to 400° F. The acrylic backing yarns can be utilized for molded objects. While they are in a strict sense of the word not heat-settable they can be deformed and set in a new configuration with heat. If one were going to make a rug, an inexpensive cotton backing yarn could be used because this would probably be back coated later.

In connection with back coating materials, since this is a knitted fabric one would need to apply a natural or synthetic latex or resin to the back of the fabric for dimensional stability. For apparel end uses this could be a clear acrylic resin, polyvinyl acetate, etc. On the other hand for a rug this could be a heavily loaded compound containing clays and other fillers in conjunction with some natural or synthetic rubber-like material to form a nonskid, dense, stiff backing. It might be desirable to laminate natural or synthetic foam rubber to the back of the long hair pile fabric.

Now referring to the fabric construction, the weight of the fabric can be varied from a very low minimum value which would essentially be the backing yarn with a few hairs in it (this may only weigh four or five ounces per square yard) to a fabric as heavy as eighty or ninety ounces per square yard. Obviously for each end use a particular weight would be chosen. For certain apparel end uses the weight of the fabric might be in the range of twenty to forty ounces per square yard, while for rugs the range of fifty to eighty ounces per square yard might be used. But this would depend on the actual fibers used. For example, one could obtain a very dense fabric by using six inch, 6 denier crimped fibers with a fabric weight of about forty ounces per square yard. On the other hand a fabric consisting of uncrimped, 40 denier, ten inch fibers might have to weigh as much as seventy or eighty ounces per square yard for equivalent fullness or cover. The construction of the fabric can also be varied by the number of courses and wales per inch. At the present time the knitting machine has five needles per inch and this gives an open construction so that the wig will be well ventilated. For wig purposes the fabric should preferably have a mesh size of between 60 and 175 openings per square inch and most preferably about 100 per square inch. On the other hand, by using ten needles per inch, a dimensionally stable and uniform construction can be obtained. Probably for all uses other than wigs the knitting machine should have ten needles per inch. The number of courses per inch can vary from about eight to thirty and the number of wales from about six to fifteen. Obviously this will depend not only on the knitting construction but on the degree to which the fabric is distorted after it is knit.

In the finishing procedures, chemical finishes such as water repellents, antistatic agents and lubricants can readily be applied to the fiber either before or after it has been knit. Silicone resins, for example, can be applied to the finished fabric to obtain good water repellency.

The ultimate esthetic and functional properties of the fabric can be considerably modified by a variety of mechanical finishing treatments to which the fabric can be submitted after it has been knit.

Pile fabrics can also be tumbled in a large tumble drier either cold, with dry heat, or in the presence of steam. During tumbling, fibers twist and wrap around each other resulting in a variety of curl and tufted configurations which may resemble the appearance of some long haired animal skins.

Also, through the use of fibers which are thermoplastic such as the modacrylic and acrylic fibers one can emboss various patterns into the pile.

It is desirable to use fibers or mixtures of fibers which will not burn. Modacrylic fibers such as Dynel and Verel will not support combustion and have the further advantage that they will decrease the rate of combustion or completely prevent the burning of other fibers with which they may be blended. The minimum percentage of modacrylic fiber required for this purpose is generally 30% but greater amounts may be necessary in certain cases.

A bulky fabric of this type could, of course, be quite heavy and uncomfortable if it became soaking wet. Fortunately these fabrics can be treated to shed water by using silicone resins. Furthermore, the fibers, themselves, such as the acrylic, modacrylic and nylon materials do not absorb water and if the fabric were to get wet the bulk of the water could be removed by shaking and/or brushing the fabric. The fabric would then dry very quickly. Animal skins and animal fibers absorb and hold considerable moisture and therefore dry very slowly.

Rot resistance, mildew resistance, moth resistance, etc. are important functional properties for fabrics. Many of the synthetic fibers, as for example, the modacrylic, acrylic and nylon fibers are particularly resistant to attack by living organisms. Furthermore, if they are stored in a damp place for extended periods there would be no problem. These long haired materials may have industrial usage in special types of filters. Dynel is particularly suitable for many types of filters because of its resistance to most solvents. On the other hand, if one required high temperature resistance, some of the newer fibers developed for this purpose could easily be made into sliver and knitted into this type of fabric.

EXAMPLES OF ARTICLES

Specific examples are described below and are illustrated with corresponding sketches.

Figure 22:
FIGURE 22 is a perspective view of a hat constructed from a deep pile fabric knit in accordance with the present invention.

As shown in FIGURE 22, a hat $22^a$ of long hair material is shown for this end use. Sometimes an elastic band is sewn inside the hat so that it stays on the head of the wearer. The inherent deformability of the fabric would permit the wearer to modify the shape at will. Or the fabric could be coated with stiff materials or laminated to stiff materials if it were necessary to manufacture a hat with a specific shape.

Figure 23:
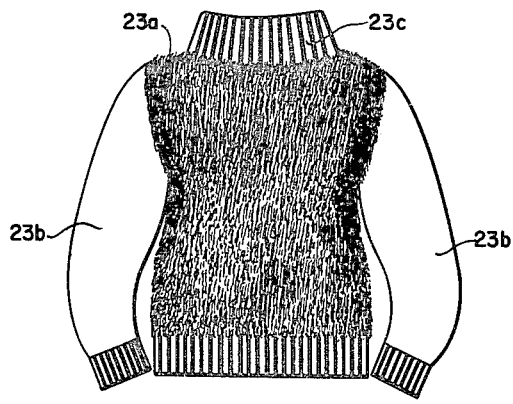
FIGURE 23 is a front elevational view of a sweater, the body portion of which has been constructed of the long hair pile fabric of the present invention.

As shown in FIGURE 23 a sweater $23^a$ of the long hair fabric may be made with or without sleeves $23^b$. In this case the body of the sweater would be the long hair fabric. Attached to the body $23^a$ is a knitted wool "turtle neck" collar $23^c$. Sleeves of a similar wool unit $23^b$ could be attached to the body. This sweater could be made in a long or short version and a belt used if desired. A sweater of this type would be similar to the caribou skins worn by Eskimos.

Figure 24:
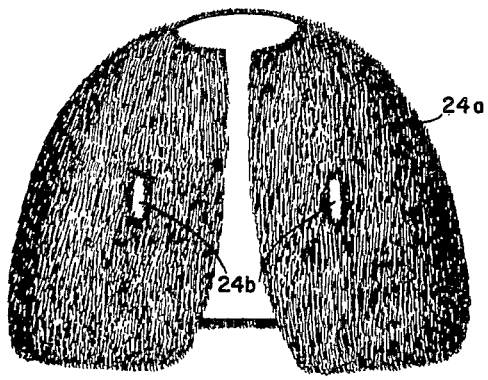
FIGURE 24 is a front elevational view of a cap constructed from the fabric of the present invention.

As shown in FIGURE 24, the long haired pile fabric would make an interesting cape $24^a$. Two slits $24^b$ could be made for armholes and the neck portion could be trimmed with a soft fabric.

Figure 25:
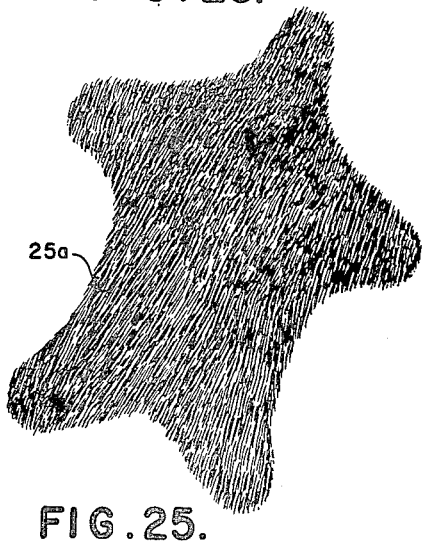
FIGURE 25 is an imitation animal skin rug constructed from fabric according to the present invention.
Figure 26:
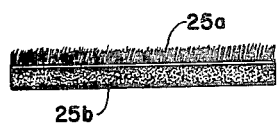
FIGURE 26 is a sectional view through a portion of the fabric of the rug of FIGURE 25 showing the application of a non-skid backing thereto.

As shown in FIGURES 25 and 26, the long hair pile fabric would be attractive for decorator purposes as a rug $25^a$ which could either be heavily back coated or laminated to natural or synthetic foam rubber $25^b$. Such rugs can be made in a variety of shapes such as circles, elipses and rectangles. Also they can be cut in the shape of animal skins and decorated in a variety of ways with eyes or by stuffing the head portion so that it looks like a bear or a lion.

Figure 27:
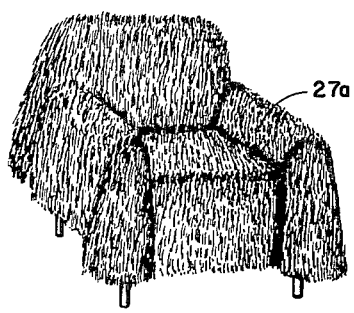
FIGURE 27 is a perspective view of a throw from a fabric constructed in accordance with the present invention as applied to a piece of furniture.

As shown in FIGURE 27, the long hair pile fabric would be particularly suitable as a throw $27^a$ for use on ships because it could be made of non-flammable materials and would not be attacked by microorganisms even if moist for a long period of time. This throw could also be used as a covering for chairs.

Other uses on which this long haired fabric may be used are jackets, hoods, boots, stuffed toys, false whiskers and masks among other things.

Although I have disclosed herein the best forms of the invention known to me at this time, I reserve the right to all such modifications and changes as may come within the scope of the following claims.

What is claimed is:

1. The process for producing stylable hairpieces for use with the head of a human being comprising the steps of
   (a) knitting a cover having inner and outer sides formed to conform at its inner side to at least a portion of the human head,
   (b) interlocking into the knit structure of the cover simultaneously with knitting the cover stylable filaments so that both ends extend from the outer side of said cover,
   (c) curling said filaments and permanetizing the thus curled stylable filaments.

2. The process for producing stylable hairpieces for use with the head of a human being comprising the steps of
   (a) knitting a cover having inner and outer sides formed to conform at its inner side to at least a portion of the human head,
   (b) interlocking into the knit structure of the cover simultaneously with knitting the cover stylable filaments both ends of which extend from the outer side of said cover,
   (c) thereafter placing said filaments on style forming means and processing said rolled filaments to "set" the waves caused thereby.

3. The process for producing stylable artificial hairpieces for use with the head of a human being comprising
   (a) knitting a cover having inner and outer sides formed to conform at its inner side to at least a portion of the human head, and
   (b) interlocking into the knit structure of the cover simultaneously during knitting the cover stylable filaments in excess of five inches in length both ends of which extend from the outer side of said cover by doffing the filaments to the needles to engage said filament lengths whereby said filaments are interlocked into said cover so that the trailing ends of said filaments will run in a straightaway linear path from the needles without interference.

4. A method of fabricating long hair pile fabric from which a wig or other textile products may be made comprising
(a) arcuately feeding a continuous web of filaments substantially all of which have lengths of at least five inches to a plurality of knitting needles,
(b) allowing said needles to engage said filament at random points along the filament lengths,
(c) knitting a base fabric on said needles and allowing a portion of said filaments to be looped into the bights of the loops of the knit structure of said fabric as said fabric is formed,
(d) through doffing means moving those portions of said filaments remaining on the doffing means over a straight line path continuous with said arcuate path which allows those portions of said filaments remaining on the doffing means to be pulled therefrom by said needles over increasingly angular paths to said straight line path whereby breakage and entaglements are minimized.

5. The process as claimed in claim 3 in which the manner of incorporation of the stylable filaments into the knit structure of the cover shall be by
(c) interknitting with the knit structure of the cover.

6. The process as claimed in claim 3 in which the manner of incorporation of the stylable filaments into the knit structure of the cover shall be by
(c) interlacing with the knit structure of the cover.

7. The process as claimed in claim 3 further comprising the step of
(c) taping the inner side of the cover proximate its terminal edges to further facilitate conformation of the cover and retention thereof upon the human head.

8. The process as claimed in claim 3 further comprising the step of
(c) bonding the filaments to the cover on the inner side thereof by the application of an adhesive thereto.

9. The process for producing stylable artificial hairpieces for use with the head of a human being having frontal, parietal, occipital and temporal lobes, portions at least of which are to be covered comprising
(a) knitting a fabric having hair stylable filaments extending from the outer side thereof, the inner side of which is a substantially smooth knit side,
(b) placing the thus knit fabric in a forming station with the hair stylable filaments down and the substantially smooth side up and deforming the fabric with a die in the shape of the general contour of a human head,
(c) imparting a partial thermal set to the knit structure of said fabric whereby upon withdrawal of the die said fabric will retain a deformed cavity portion,
(d) inverting the thus formed fabric with the smooth knit side up and the hair stylable filament side down about a head form,
(e) taping the thus captive fabric proximate the terminal edges of the fabric to the general areas of the human head to provide the terminal edges of the thus formed hairpiece with expandable and contractile properties,
(f) trimming the excess fabric therefrom,
(g) reinverting the thus formed hairpiece on the head form and putting the stylable filaments in curlers thereafter thermally setting the hair while in the curlers, and
(h) thereafter removing the curlers and styling the hair.

10. The method of claim 9 further comprising the step of
(i) applying a bonding adhesive to the inside of the knit fabric prior to taping.

References Cited by the Examiner

UNITED STATES PATENTS

| 553,433 | 1/96 | Siccardi | 132—56 |
| 1,017,253 | 2/12 | Etienne | 132—56 |
| 1,199,144 | 9/16 | Zak | 132—5 |
| 2,405,791 | 8/46 | Lamoreux | 132—5 |
| 2,531,685 | 11/50 | Jacoby | 132—5 |
| 2,737,702 | 3/56 | Schmidt et al. | 66—9 X |
| 3,066,358 | 12/62 | Schiess | 19—106 X |

FOREIGN PATENTS

| 637,313 | 5/50 | Great Britain. |
| 21,387 | 2/83 | Germany. |

RICHARD A. GAUDET, *Primary Examiner.*